United States Patent
Larsson et al.

(12) 
(10) Patent No.: US 6,697,638 B1
(45) Date of Patent: Feb. 24, 2004

(54) INTELLIGENT PORTABLE PHONE WITH DUAL MODE OPERATION FOR AUTOMOBILE USE

(75) Inventors: Torbjorn Larsson, San Diego, CA (US); Donald R. Green, Jr., San Marcos, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/430,690

(22) Filed: Oct. 29, 1999

(51) Int. Cl.[7] .................................................. H04Q 7/32
(52) U.S. Cl. .................. 455/553.1; 455/41.2; 455/41.3; 455/11.1; 455/556.1; 455/557
(58) Field of Search .............................. 455/41, 11.1, 7, 455/552, 553, 556, 575, 88, 41.2, 41.3, 553.1, 556.1

(56) References Cited

U.S. PATENT DOCUMENTS 5,659,594 A * 8/1997 Toda ........................... 455/552
5,839,051 A * 11/1998 Grimmett et al. .......... 455/11.1
6,493,550 B1 * 12/2002 Raith ......................... 455/41 X
6,519,460 B1 * 2/2003 Haartsen .................... 455/41 X

OTHER PUBLICATIONS

The persons who contributed to this specification are listed in Appendix II on p. 423, "Specification of the Bluetooth System", Specification vol. 2, Profiles, *Bluetooth*™, Jul. 26, 1999.

* cited by examiner

*Primary Examiner*—Nay Maung
*Assistant Examiner*—Philip J. Sobutka
(74) *Attorney, Agent, or Firm*—Harness, Dickey & Pierce, PLC

(57) ABSTRACT

A system for operating a cellular phone using Bluetooth with a car kit is described. The Bluetooth protocol is used to communicate between the cellular phone and the car kit. A communication can be established between the cellular phone and the said car kit. In one mode, the car kit can be made to assume the identity of the cellular phone and transmit as if it were the cellular phone itself. In another mode, the car kit can become a hands-free set for the cellular phone which communicates with the cellular phone via Bluetooth.

9 Claims, 14 Drawing Sheets

INTELLIGENT PORTABLE PHONE WITH DUAL MODE OPERATION FOR AUTOMOBILE USE

BACKGROUND

Portable telephones such as cellular telephones are in common use. A hand-held cellular telephone enjoys the convenience of portability. A car mounted cellular phone is also known.

A car-mounted cellular phone has certain advantages. For example, since the car-mounted phone uses an external antenna, it may get better cellular reception. An external antenna may also enable the car kit to transmit with higher power than is allowable with a hand held phone.

A "car kit" is often an interface between the automobile and the telephone. The car kit can act as a part of the hand-held cellular phone. The hand-held phone plugs into the car kit, and uses the structure of the car kit for transmission and reception, e.g., to an external antenna. The car kit can also have a hands-free kit that allows the user to talk on the telephone without using their hands. Some jurisdictions, in fact, require a user's hands to be free while driving.

Automobile-mounted communication devices can be installed into automobiles for various purposes. For example, the Telematics (TM) and Mayday (TM) systems install a transceiver into the vehicle. These systems can be used for signaling law enforcement authorities when the automobile is stolen or carjacked. These systems include radios therein.

Car kits can often only be used with the cellular phone itself being present. If the user forgets to bring their phone into the car, then the car kit becomes useless.

An automobile mounted cellular phone can be used without a hand-held cellular phone being present. However, this requires that the automobile mounted cellular phone have a separate telephone number from the handheld cellular phone, and also requires that the user pay two monthly service fees.

SUMMARY

The present application defines a new telephone interface device adapted to be mounted in a vehicle. The device can interface with a portable telephone, and take on the character of the portable telephone (from claims here).

According to a particularly preferred embodiment, the system uses a low power consumption, wireless protocol, which includes automated service discovery, spread spectrum operation, clock synchronization, defines unique identities, and allows multiple access via time slot system. According to a particularly preferred embodiment, this protocol can be the so-called Bluetooth protocol.

BRIEF DESCRIPTION OF THE DRAWINGS

These and other aspects will be described in detail with reference to the accompanying drawings, wherein.

DESCRIPTION OF THE PREFERRED EMBODIMENTS

Figure 1:
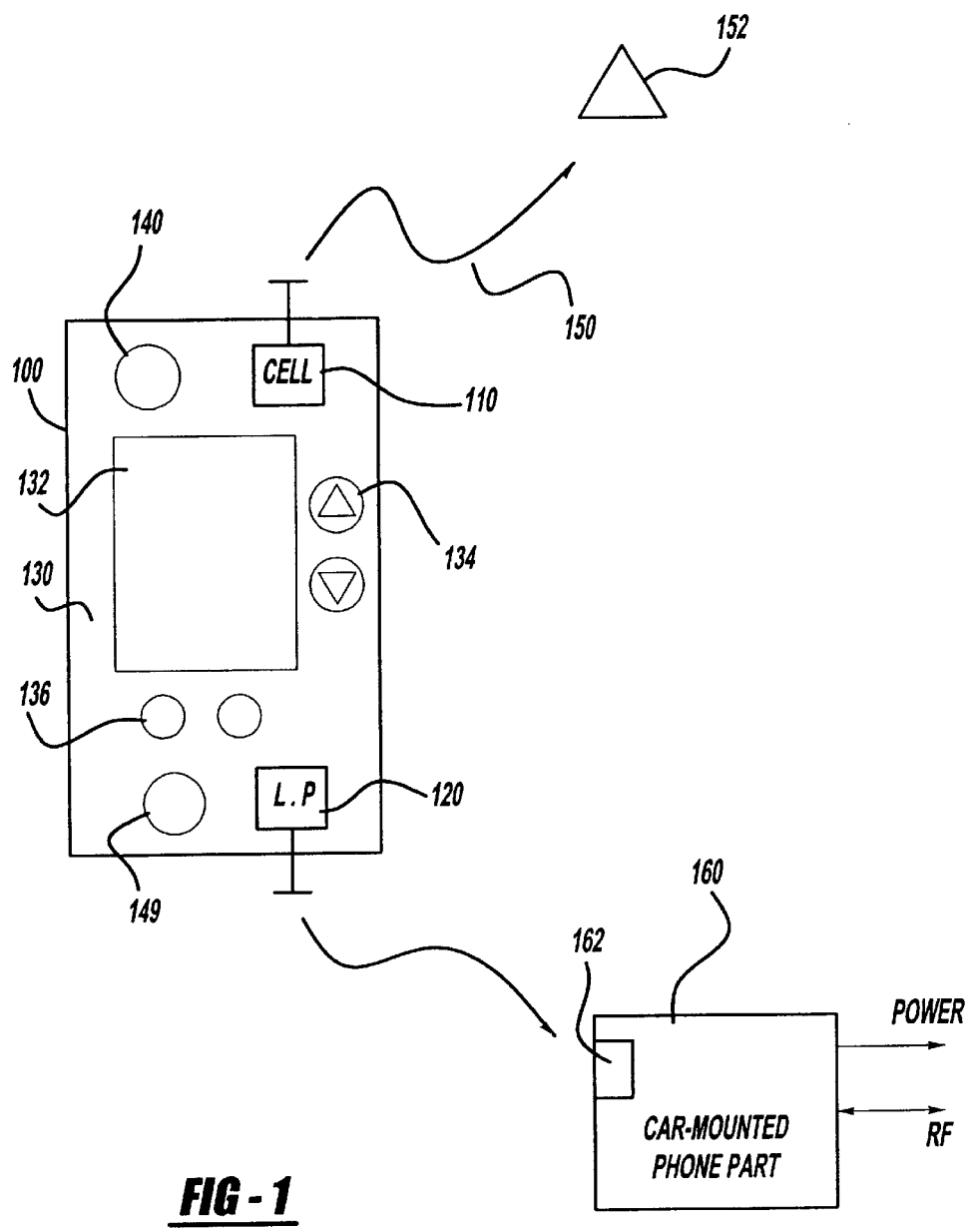
FIG. 1 shows a block diagram of the system.

A block diagram of the overall system is shown in FIG. 1. A hand-held portable telephone has two transceivers therein: shown as a cellular transceiver 110, and a low power transceiver 120. The cellular transceiver 110 transmits on a cellular band, e.g., 800–900 MHz, at cellular power levels, e.g., 0.2–0.6 watts. The lower power transceiver 120 transmits at much lower power levels, e.g., less than 1 mw, more preferably 100 microwatts or less. The lower power transceiver can be, for example, a Bluetooth transceiver which operates using the Bluetooth standard.

The hand held cellular telephone includes, as conventional, a user interface 130 which includes a menu 132, a plurality of navigation keys 134, selection keys 136, as well as the standard items used for cellular telephony including an earpiece 140 and a mouthpiece 142. The cellular telephone communicates with the cellular system 152 via wireless communication 150.

The lower power transceiver 120 communicates with a corresponding transceiver 162 mounted in a vehicle-mounted phone part 160. The vehicle-mounted phone part 160 is preferably mounted in vehicle e.g. an automobile, and is powered from the automobile's battery. The vehicle-mounted phone part ("car kit") 160 also transmits and receives RF using the external antenna on the automobile.

The portable phone communicates with the car kit using Bluetooth. While the present invention is not limited to use with Bluetooth, the techniques of Bluetooth are often highly advantageous. The detailed implementation of Bluetooth can be found in Bluetooth specification volume 2, version 1.0A, Jul. 26, 1999.

In general, the Bluetooth specification is a standard intended for relatively short range, e.g., 100–200 meter, wireless communication. Bluetooth can operate at a number of different power levels, including a 0 dBm level transmit power (e.g., 1 milliwatt) in which the communication has a 10-meter range, and a 20 dBm transmit power (e.g., 100 milliwatts) which has a 100-meter range. Bluetooth operates at around 2.4 GHz, and is capable of transmitting data at about 1 Mbit/sec. Bluetooth is a multiple access system, which uses a frequency-hopped spread spectrum with time division duplex. The frequency hopping occurs at about 1600 hops/sec. Each Bluetooth device has a unique 48-bit address.

Figure 2:
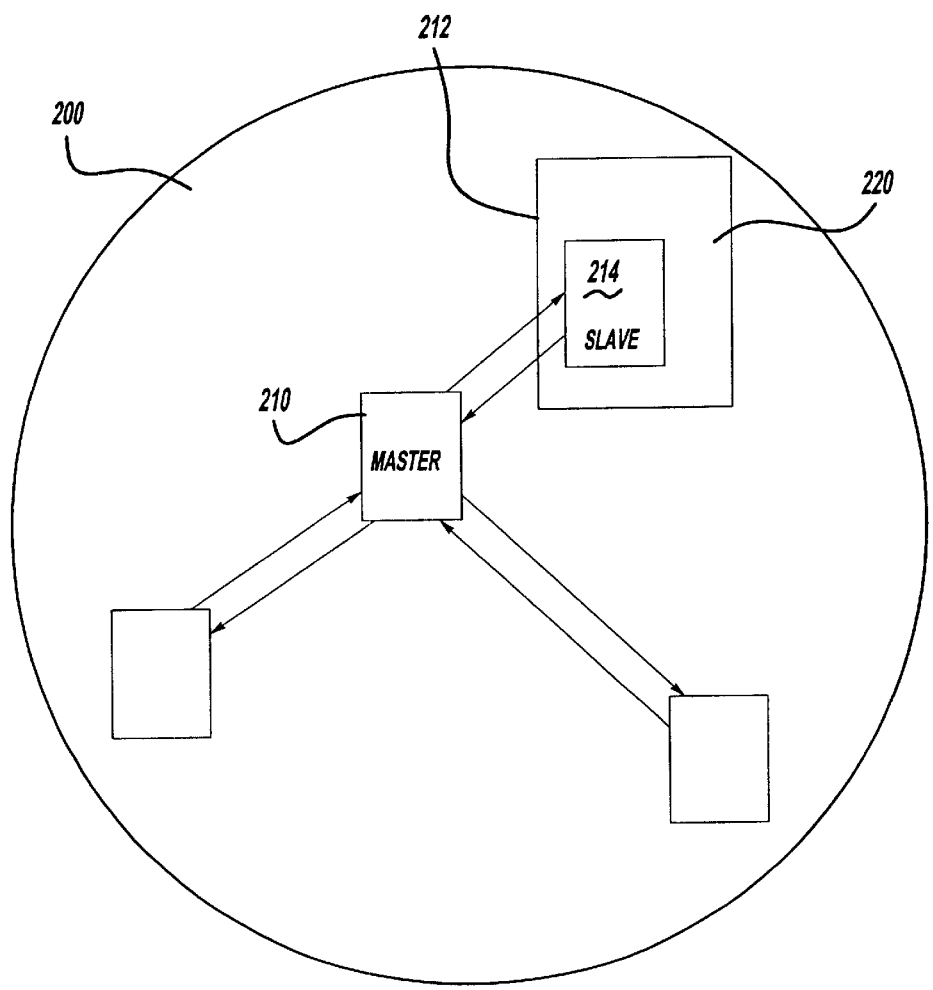
FIG. 2 illustrates a basic Bluetooth piconet.

A basic Bluetooth piconet 200 is shown in FIG. 2. The piconet 200 is between a master 210 and one or a plurality of slaves such as 220. Each of the units in the piconet includes an electronic device 212, and Bluetooth transceiver unit 214.

The device that initiates the communication is always called the master. The master can communicate with one, or more than one, slave unit. The piconet 200 shown in FIG. 2 is illustrated as communicating with a plurality of different slave units. The master unit controls the traffic and provides a time reference for the slaves. All the units share the same frequency-hopping sequence defined by the master. In addition, one Bluetooth device can become a member of several piconets.

As described above, each Bluetooth unit is uniquely identifiable based on its 48-bit address. Each Bluetooth unit can also include a Bluetooth device name, which is a user-friendly text string, having a maximum of 240 bytes. A Bluetooth passkey can be included, that forms a personal identification number. This can restrict access.

Bluetooth's multiple access scheme operates based on the master sending a request and waiting for a response. The send respond is based on the master's clock. All units in the and piconet synchronize with the master's clock.

A number of other features are defined by the Bluetooth Specification, including additional features for initiating and terminating communications among the units.

The basic system operates as described with reference to FIG. 3. At step 300, the phone 100 and the vehicle-mounted part 160 ("car kit") come within range of each other.

At step 310, the car kit 160 and phone discover each other using a low power communication scheme that is different than the communication scheme used by the cellular network. In this embodiment, that scheme is by Bluetooth. Step 310 makes at least one of the car kit 160 and/or the handheld phone 100 aware of one another.

At step 320, the car kit and handheld phone exchange information. This exchange of information between the car and phone determines information which allows them to communicate. At step 330, the car kit and the phone, in communication with one another, carry out communication with the cellular system. In a preferred embodiment, the communication with the cellular system includes transceiver operations by the car kit.

After the communication is finished, communication needs to revert. Step 340 shows a reversion, in which the car kit and the hand held phone lose communication with one another.

Step 310 defines the car kit and hand held phone discovering each other via Bluetooth. This can occur in a number of different ways. A first embodiment of step 310 is referred to herein as mode 1A and described with reference to FIG. 4. In this embodiment, communication is activated automatically by bringing the devices into range of one another.

At step 400, a driver with a telephone handset enters the car. The car senses the "event" of the user entering. The event can be sensed by any action that the car can sense, including actuating the car ignition key, a seat sensor detecting the driver sitting on the car's seat, a tilt sensor detecting the door being opened, a burglar alarm de-initiation, or any other event which can be determined by any circuitry in the car. Any of these events indicates that the user is close to the car.

When the car detects an event, the car kit 160 starts transmitting inquiries at step 402. The inquiries are sent periodically until operation is established, or for some fixed period. However, the polls are only sent in response to an event detection to minimize radio traffic on the Bluetooth system. Otherwise, a parking lot full of automobiles could each be conducting Bluetooth polls, clogging the Bluetooth band. In addition, this conserves vehicle battery power.

The handset in this embodiment is periodically scanning for inquiries. Step 404 represents the handset receiving an inquiry. The handset sends an inquiry response back to the car kit. The inquiry response includes the Bluetooth device address BD_ADDR.

At step 406, the car kit 160 determines if one or many units have responded. If only one unit has responded, then the car unit pages the responding handset at 408. If more than one unit has responded, then the car unit compares each received Bluetooth address with a list of recognized addresses at 410 and selects one of those for paging. After paging one, the car kit can subsequently page another of the units, or can allow communications with only one of the units.

A piconet is established at 420, with the car kit 160 being established as the master and the selected handset as the slave. Additional piconets can also be established between the car kit 160 and other Bluetooth devices. The master unit then initiates an SDP session at 422 by querying the handset for supported services. Communication proceeds.

Figure 5:
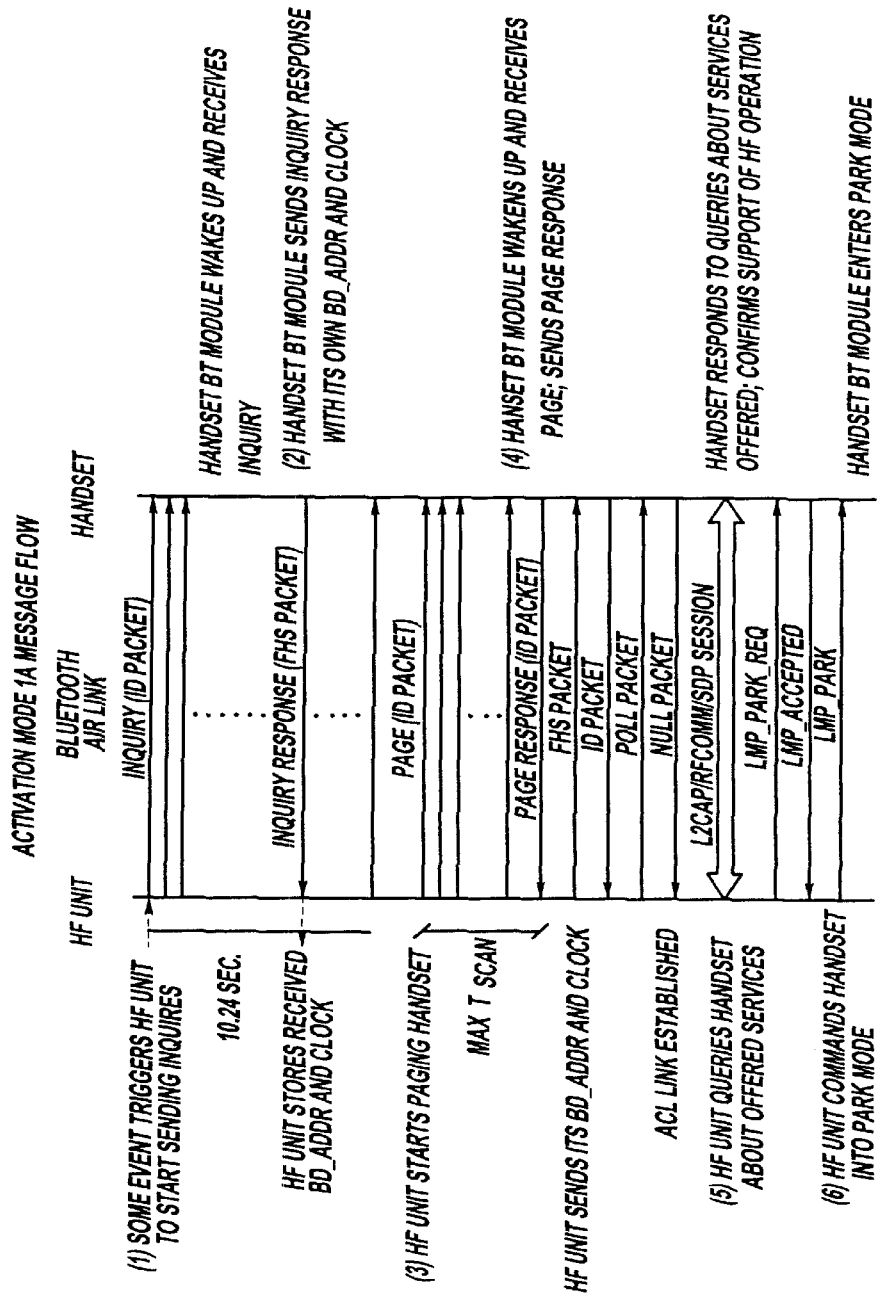
FIG. 5 illustrates the message flow for FIG. 4.

The message flow as described above is also shown in FIG. 5.

Mode 1A allows the car kit to establish communication with any recognized Bluetooth device.

Figure 4:
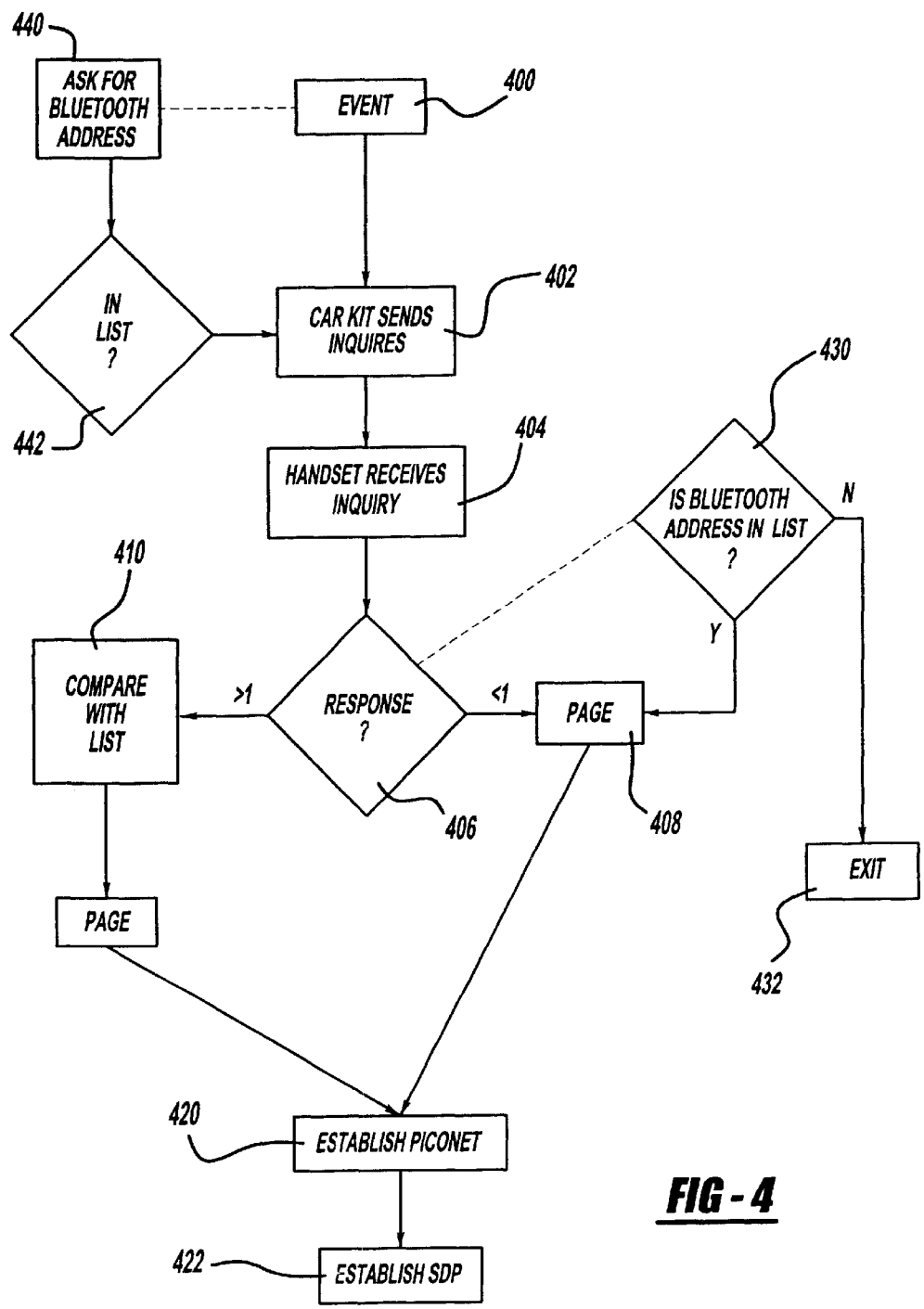
FIG. 4 illustrates the car kit and the hand held phone discovering each other.

Mode 1B allows communication with only those devices that are on an allowed list. Step 430, shown in FIG. 4, is executed only for mode 1B. Step 430 illustrates comparing the Bluetooth address with a list of addresses corresponding to handsets that have been approved. If the current address is not in the list, the handset is ignored at step 432. If the current address is in the list, however, then control passes to step 408 where the recognized unit is paged.

Mode 1C operates by responding to the Bluetooth text addresses, rather than to the Bluetooth 48 bit address. Step 440 in FIG. 4 shows mode 1C, in which the car unit requests the handset to reveal its Bluetooth device name (VD_name). The Bluetooth device name is compared with a list of pre-authorized names at 442. Paging is allowed only if the handset is recognized.

Figure 6:
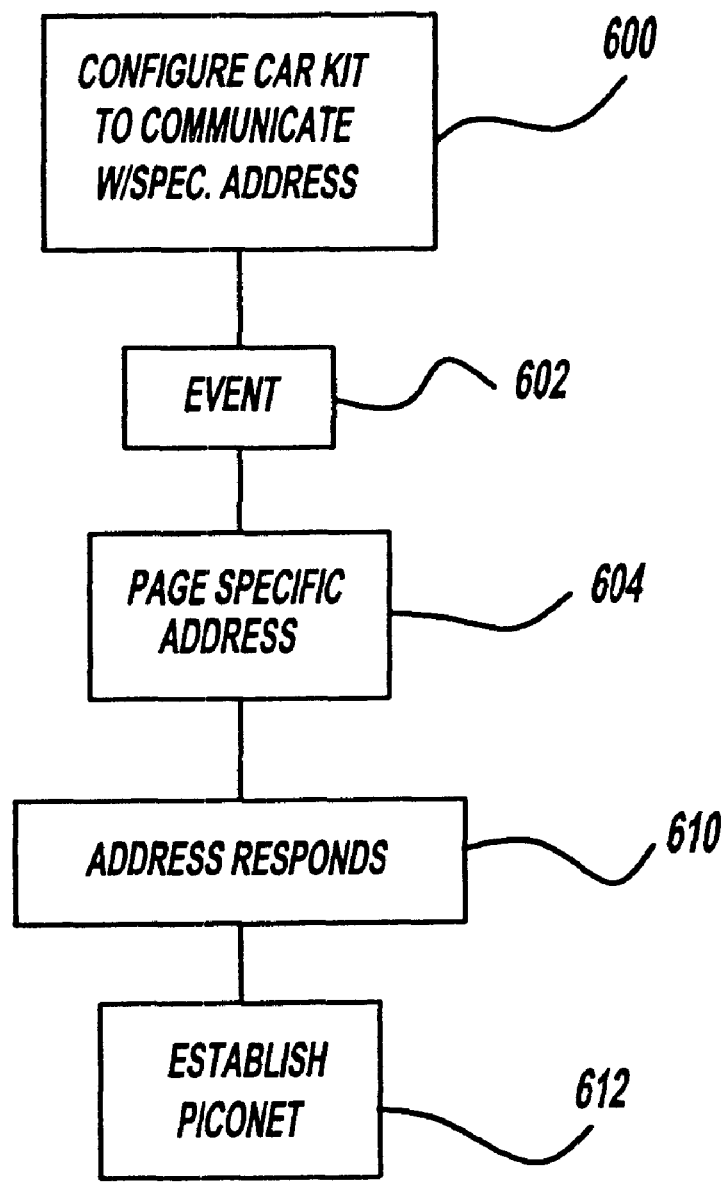
FIG. 6 illustrates system operation in accordance with another mode.
Figure 7:
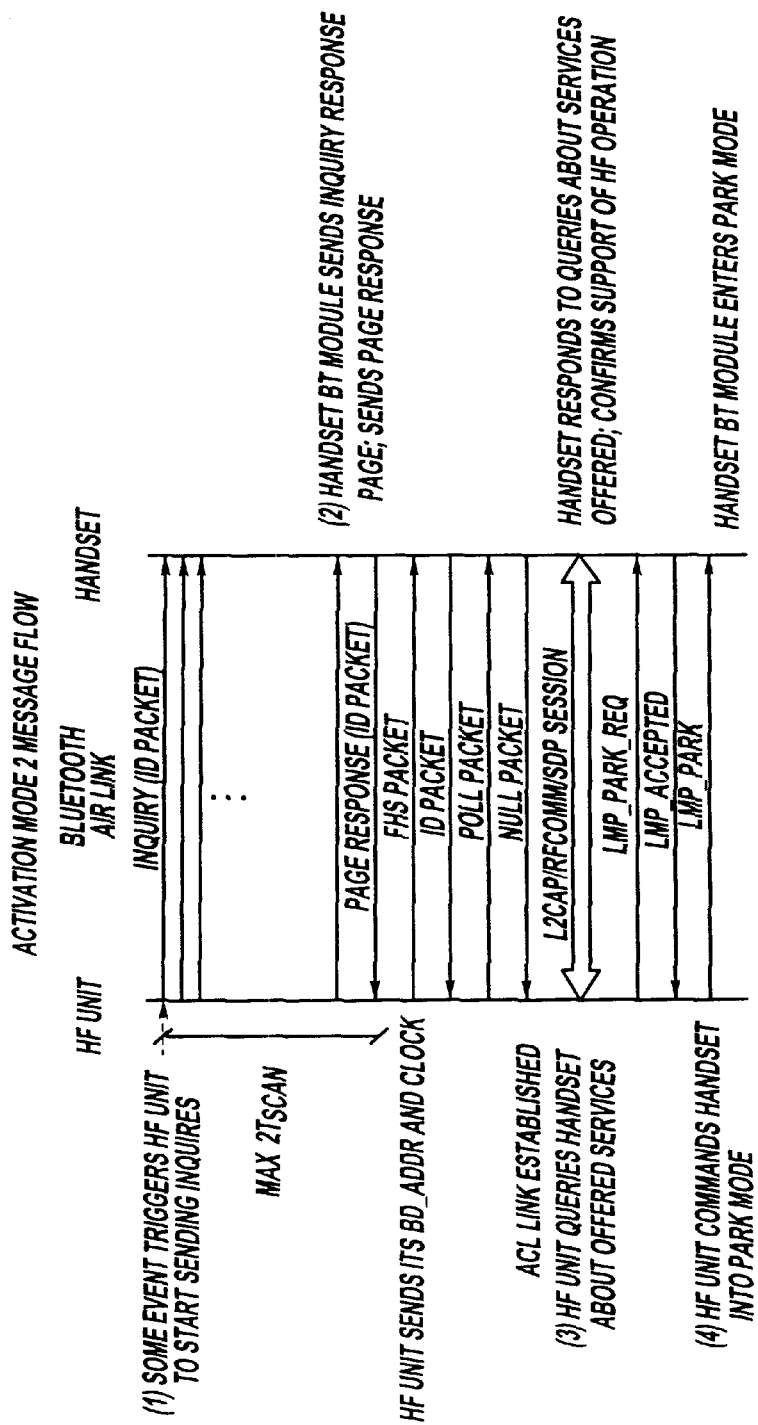
FIG. 7 illustrates the message flow for FIG. 6.

The mode 2 operation is shown in FIGS. 6 and 7. The mode 1 operation uses Bluetooth inquiries from the car kit to page the handset. This means that the handsets must be "discoverable" by the Bluetooth inquiries. Mode 2 does not require discoverable handsets. In FIG. 6, an initial set up 600 is carried out, in which the car kit is programmed to work with one or a list of specific handsets. An event occurs at step 602, such as described above. Responsive to this event at 602, the car unit begins paging Bluetooth devices, but only those devices that are on its list, at step 604. The paging continues until a device responds, or a preset time passes.

If one of the paged handsets responds at 610, a piconet is established at 612, using the car kit 160 as the master. Again, the unit initiates an HTP session. FIG. 7 shows more detail on this message flow.

An advantage of mode 2 is that only specific Bluetooth devices are paged, and the Bluetooth device hence need not be discoverable. Certain security may also be provided, since the device must be authorized in advance.

Figure 8:
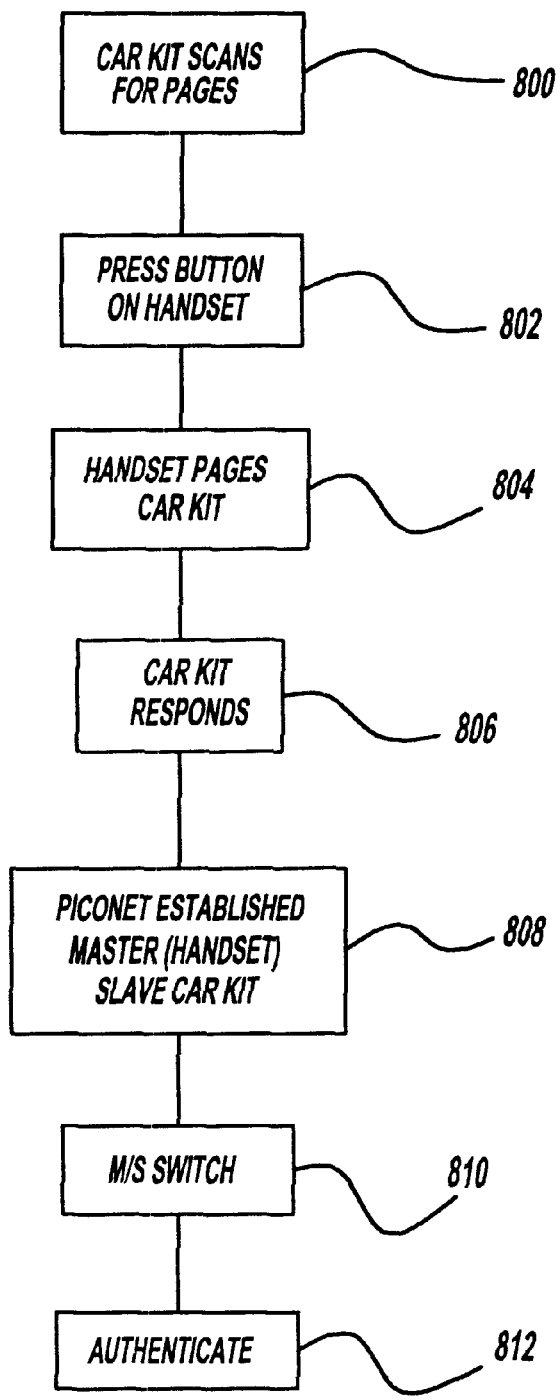
FIG. 8 illustrates system operation in accordance with another mode.
Figure 9:
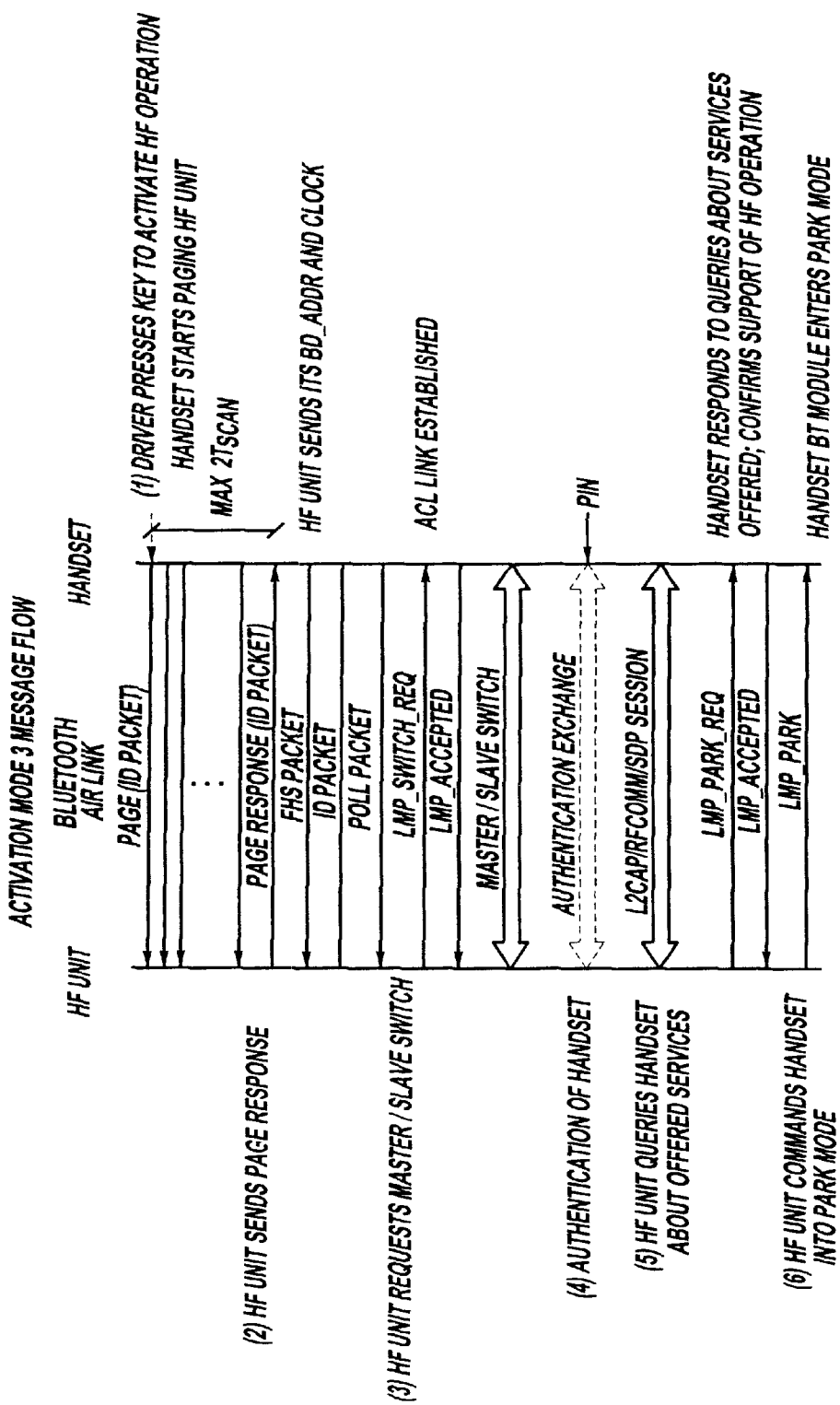
FIG. 9 illustrates the message flow for FIG. 8.

Mode 3 requires manual actuation to establish the piconet. Step 800 in FIG. 8 shows the unit in the car periodically scanning for pages. Note that the car kit scans for pages, as opposed to scanning for inquiries. In generally the car kit will not be discoverable.

At step 802, the driver approaches the car, and presses a special key on the handset keypad which is preset to activate car/phone operation.

The handset may store a list of several car unit identifiers, e.g. their Bd__addr. The key press causes the handset to page the car kit at 804. The car kit responds at 806. A piconet is then established with the handset as the master at 808.

At step 810, a master-slave switch operation is carried out. This makes the car kit become the master of the piconet. This switchover minimizes power consumption in the handset.

Authentication may then be carried out at 812.

Figure 10:
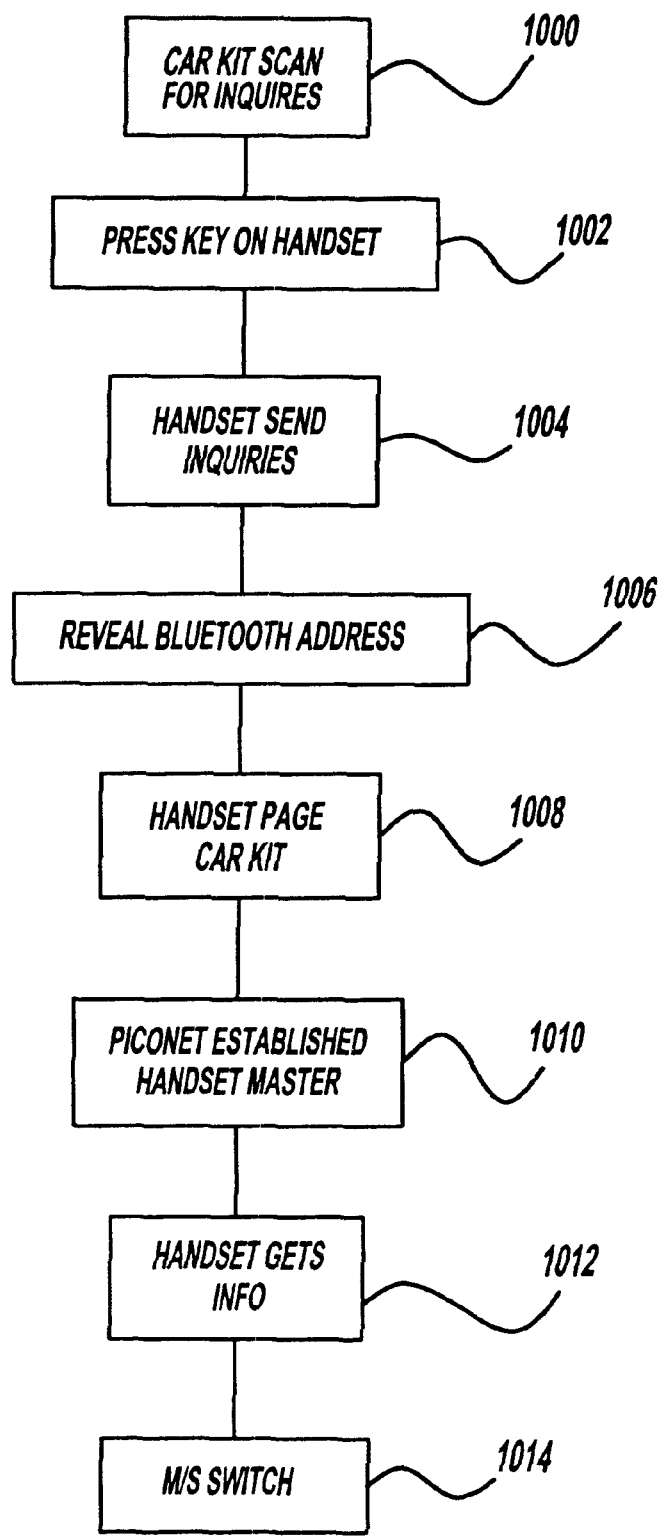
FIG. 10 illustrates system operation in accordance with another mode.

A mode 4 operation is shown in FIG. 10 which provides increased security. This system requires manual initiation on both the car kit 160 and on the hand unit 100. FIG. 10 shows the driver pressing a key on the car kit 160. This causes the car unit to start scanning for inquiries and pages for a limited time. The limited time can be for example, 30 seconds.

At step 1002, the driver presses a key on the handset, causing the handset to start transmitting inquiries at 1004. The car kit, which is scanning for these inquiries, responds to one of the inquiries at 1006 and reveals its Bluetooth address to the handset. The handset then pages the car unit at 1008. When the car unit responds, a piconet is established with the handset as the master at step 1010.

At step 1012, the handset requests and displays information from the car kit. This includes the car registration number. The driver acknowledges the desire to connect to the particular unit by pressing a key on the handset keypad? At step 1014, a master slave switch is carried out, leaving the car unit as the master.

Figure 11:
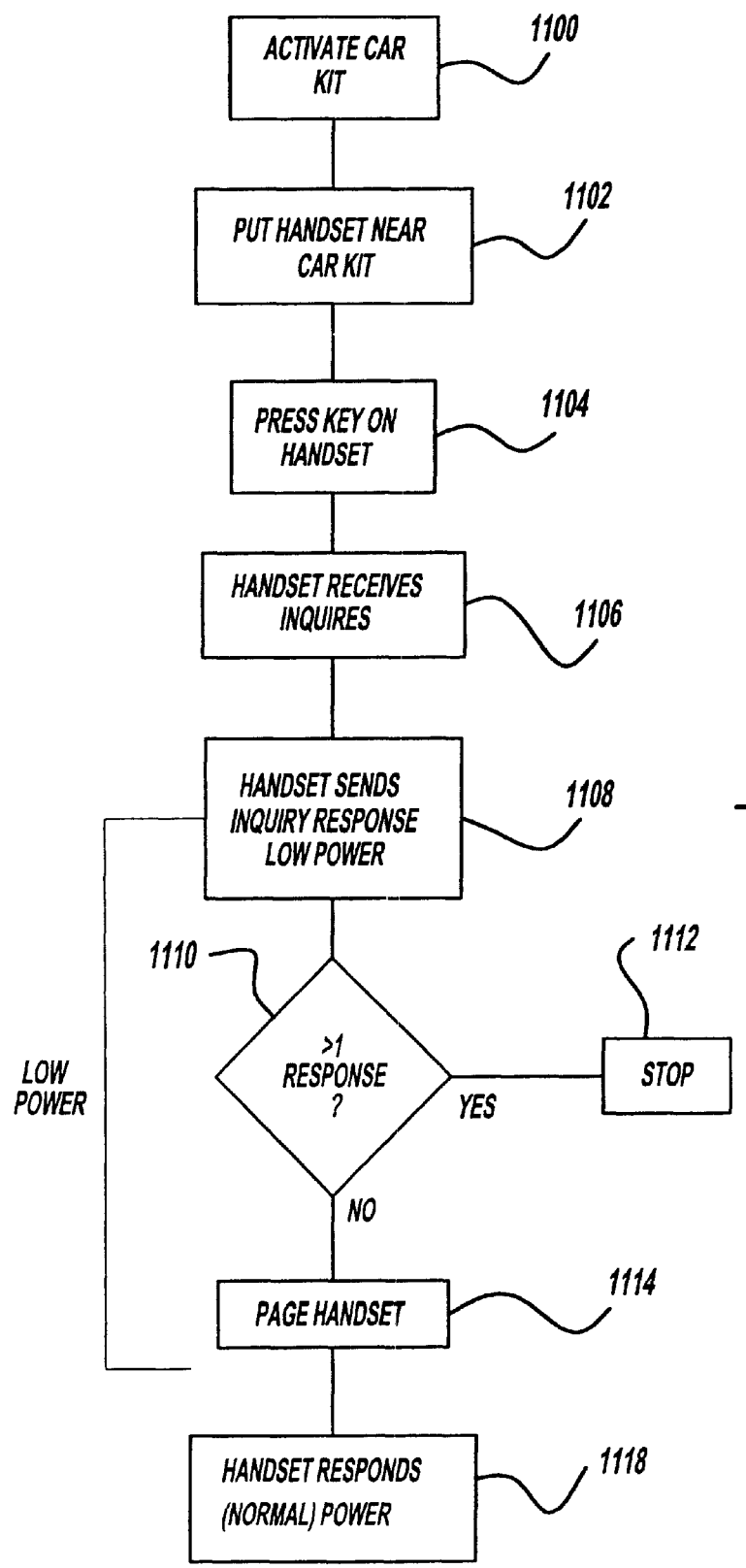
FIG. 11 illustrates system operation in accordance with another mode.

FIG. 11 shows a modification of the FIG. 10 embodiment, which enables a "guest" handset, e.g. an unrecognized handset which has not been previously used. In FIG. 11, as in FIG. 10, an actuation is carried out on the car kit at step 1100. This causes the car unit to start sending inquiries. Next, at step 1102, the driver holds the handset within a few inches of the car kit. The driver presses the key on the handset at 1104, causing the handset to start scanning for inquiries and pages. At step 1106, the handset receives an inquiry, and sends a reduced power inquiry response at 1108. The inquiry response at 1108 is at a power that is sufficiently low to make the communications range relatively short. The inquiry response includes the handset's Bluetooth device address.

Step 1110 determines if the car kit has received responses from more than one Bluetooth device. If so, the activation procedure is stopped at 1112. If only a single response is received, the car unit starts paging the responding handset at 1114. Both units—the car kit and the handset—transmit at nominal power after this page. At step 1118, the handset responds to one of the pages, and establishes a piconet with the car unit as the master.

The car/phone processing is carried out at step 320. A first mode of car/phone processing is a relatively simple hands-free system, in which the hand-held unit and the car-mounted unit communicate with one another. The car-mounted unit becomes a slave of the hand-held unit. The first mode is described herein.

A second mode of the car-phone processing effects an identity transfer mode, in which the car mounted unit obtains the identity of the handset, and transmits as though it was the handset. In this second mode, the ESN and other cellular information from the handset are sent from the car kit, thereby causing the car kit to operate and emulate the handset. In that mode, the car kit takes the identity of the hand-held unit.

Figure 12:
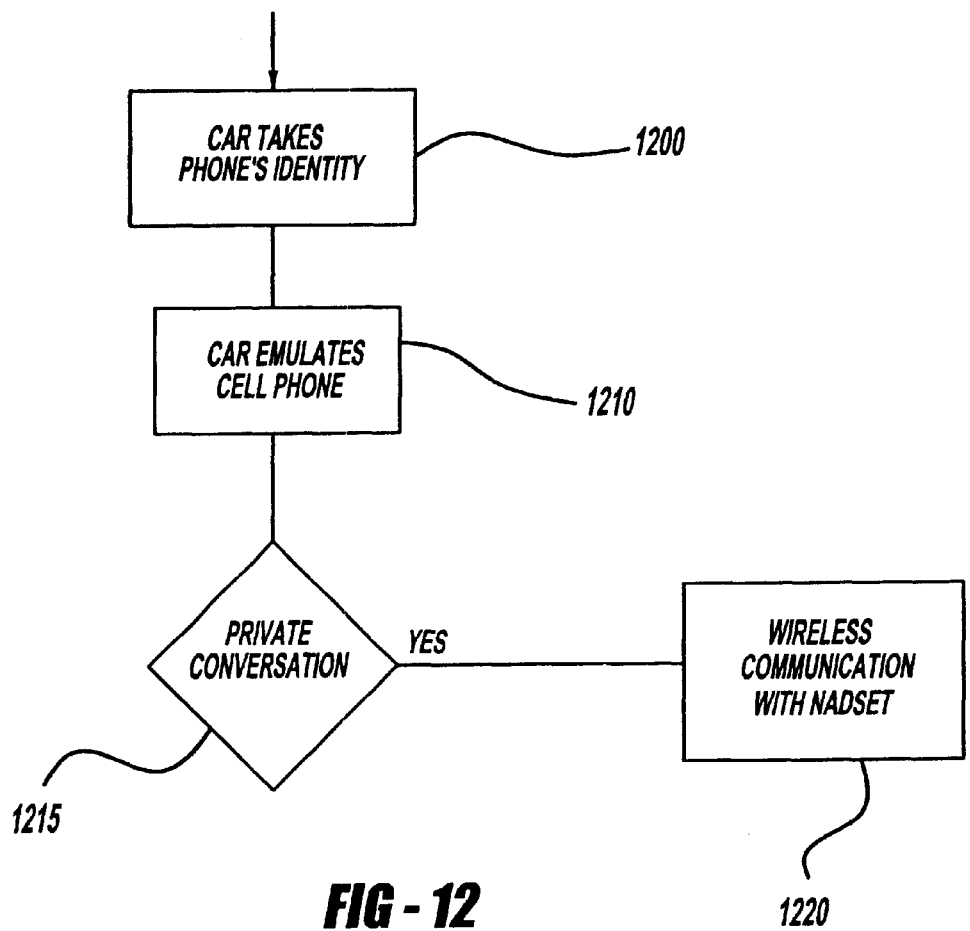
FIG. 12 illustrates a flowchart of the operation of the system.

A flowchart of the operation in this second mode is shown in FIG. 12. Note that this occurs after the communication/authentication sequence noted above. At step 1200, the car takes the identity of the handset. This means that the car kit transmits the ESN, "NAM" and other electronic information that are associated with the handset, and the billing that is done for the handset. Since the cellular phone is identified by this identity information, the car kit becomes, the cellular handset.

Once the transmission has been completed, the car takes the phone's identity at step 1200 and therefore transmits and receives just as if it were the cellular phone. Step 1210 shows the car emulating the cellular phone. The car kit operates to transmit the ESN and NAM from the hand-held phone. The car kit preferably operates in hands-free mode during this operation, that is, so that the car kit becomes a speakerphone.

At step 1220, a private conversation is initiated using the handset. A private conversation is carried out using the cellular handset in combination with the car kit. The car, which is the master of the piconet, initiates a Bluetooth wireless communication with the hand-held phone. The communication is via Bluetooth and can be a digital communication. Voice spoken into the hand-held unit is sent to the car kit via Bluetooth. Received audio from the cellular communication is digitized and sent to the handset via Bluetooth communication. Step 1220 hence represents wireless communication via a local piconet, and that the communication carried with the handset is then transmitted to the cellular network and becomes a cellular communication. In this way, the cellular handset becomes a cordless phone associated with the car kit.

Figure 13:
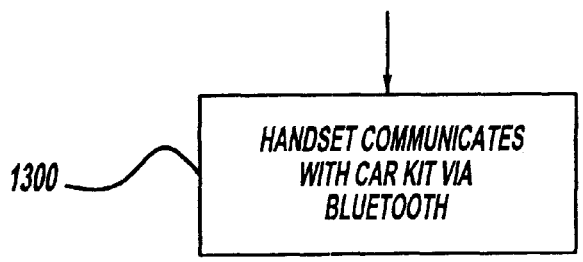
FIG. 13 illustrates a flowchart of the operation of the system in another mode.

The mode 1 operation is shown in FIG. 13. Effectively, only step 1220 is carried out in this step. The car phone becomes a speakerphone accessory for the handset. As shown in step 1300, the handset communicates with the car kit via Bluetooth. The handset still carries out the communication, but uses the car kit as an accessory.

Note that, as described herein, the car kit can be more than just a speakerphone, and also can act as an RF booster for the handset.

Figure 14:
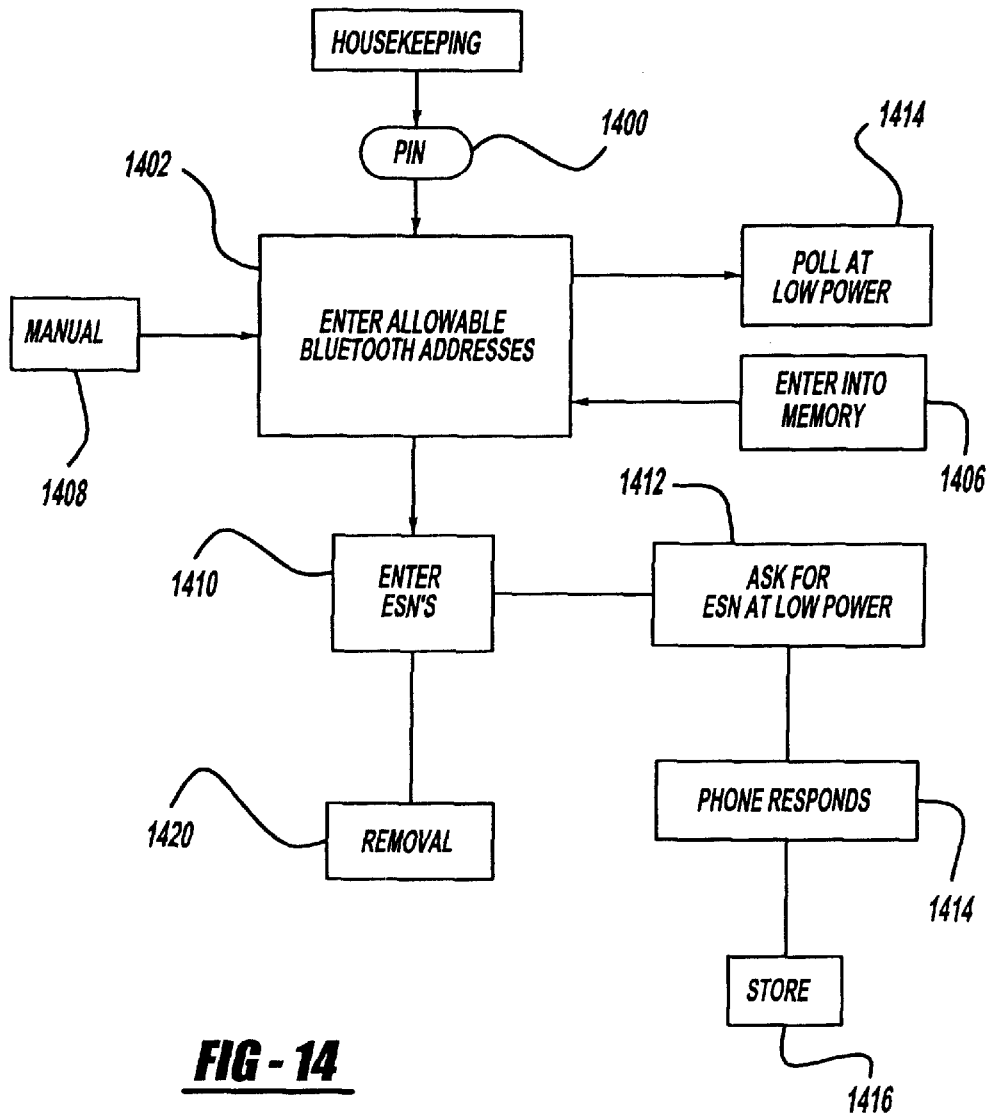
FIG. 14 illustrates a housekeeping operation.

FIG. 14 shows the housekeeping routine which is carried out according to one mode of the operation. At step 1400, a PIN or other password is entered into the car kit. This causes a menu on the car kit to be brought up, allowing the different housekeeping options. A list of allowable Bluetooth addresses which can be entered is found at 1402. Since the Bluetooth addresses are 48-bits in length, preferably this is done in an automated manner. For example, this could be done by initiating the mode, as shown in FIG. 14 which begins polls at the lowest possible power mode, for all Bluetooth devices within range. A very low power mode is used at step 1404 so that only devices within a short distance, e.g. 12 inches, will respond. If more than one device responds, the routine exits. If only one device responds, then that device is added as an allowable device into the list. The Bluetooth address, as well as any other identifying information (phone type and model, or Bluetooth text address) is entered into memory at 1406.

In one of the modes described above, the system uses Bluetooth text addresses. This includes more user friendly addresses, and hence can be manually entered via the user interface at step 1408. The manual entry of text addresses has higher security, since there is no transmission to be intercepted in this mode.

Step 1410 represents the entry of phone identity. The phone identity is typically thought of as its electronic serial number or ESN, and the phone's NAM and phone number contents. At 1412, a low power, secured entry mode is established, in which the system asks a specified unit from its Bluetooth address for its ESN. This is done at low power, with for example a 1-meter range, so that the possibility of data interception becomes minimal. In addition, since most cellular phones already include encryption facilities, the transmission can be encrypted for even further security. The phone responds with its ESN at 1414. The received ESN is stored into the memory of the car kit at 1416.

Step 1210 described above recites that the car kit emulates the cell phone.

Step 1410 allows specified phones or all phones to be removed from the list. For example, when the automobile changes ownership, the user may want to totally reset the contents of the memory for security purposes. In addition, temporary entry of information can be allowed, and can be removed via the removal step.

Figure 15:
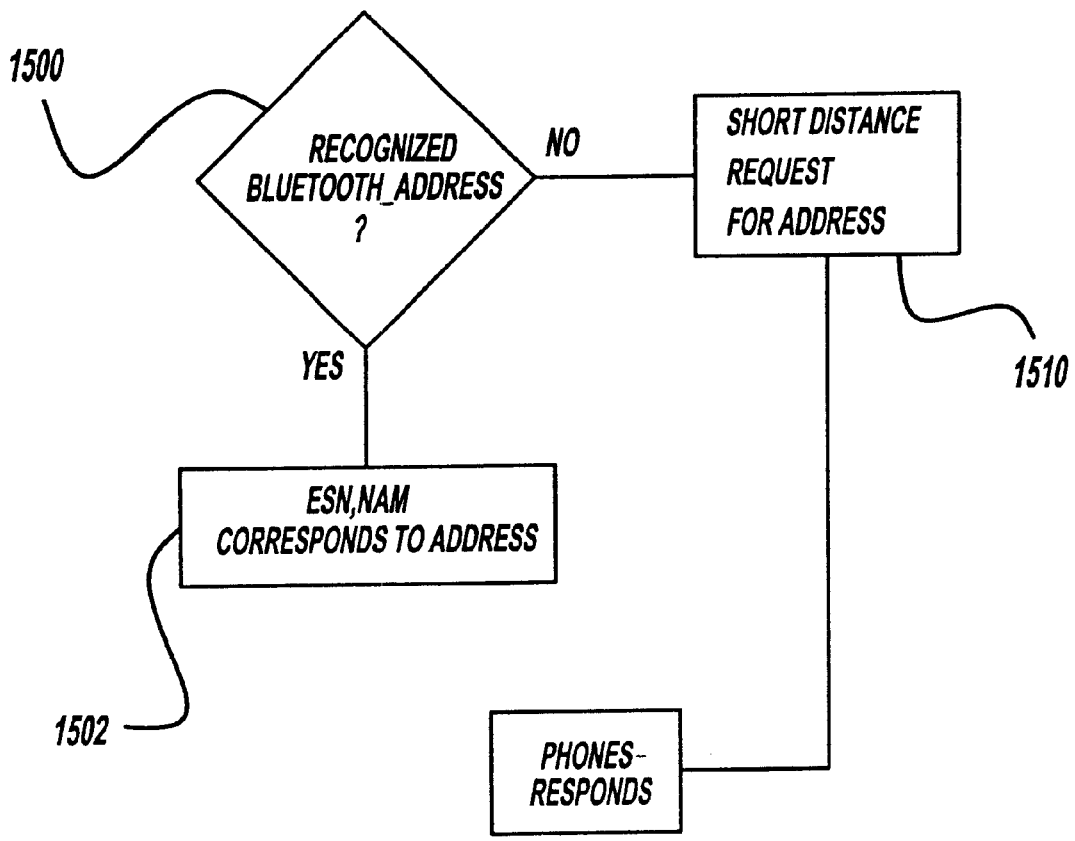
FIG. 15 illustrates system operation in accordance with another mode.

The mode two operation, in which the car kit emulates the cell phone, relies on the car obtaining the virtual identity of the cell phone. In one mode, described above, the ESN is stored in the memory. This mode operates as shown in FIG. 15. The system searches for a recognized Bluetooth address at 1500. If a recognized Bluetooth address is found, then the phone operates with the stored ESN and NAM associated with the recognized Bluetooth address at step 1502. This puts ear kit the phone into a virtual phone emulating mode.

FIG. 15A represents the prestored mode. An alternative mode is shown in FIG. 15, when the car does not recognize the Bluetooth address is that a short distance request for the address is sent by the car kit at 1510. The phone responds by transmitting, in the low power mode, and via encrypted communication, its ESN and NAM. The transmitted ESN and NAM are stored within a memory of the car kit. They can later be used to "identity" of the phone during an identity transfer mode.

Figure 3:
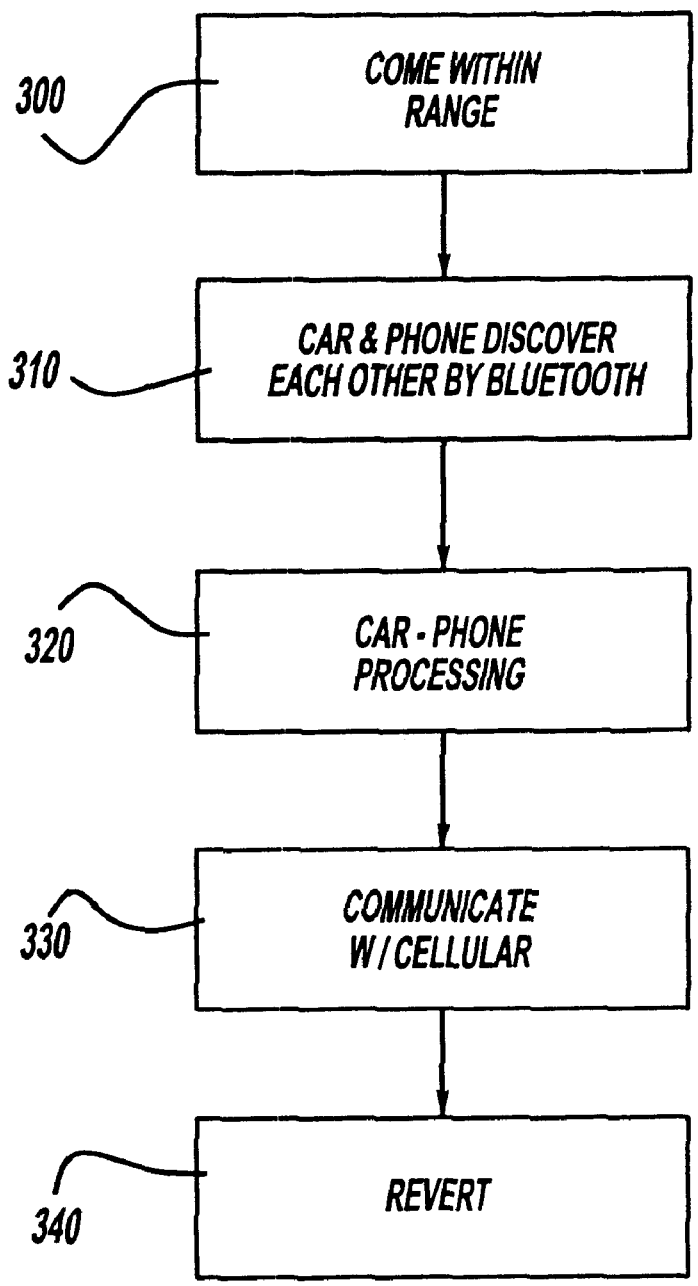
FIG. 3 illustrates basic system operation.

Step 340 in FIG. 3 is controlled out by the car kit periodically polling the handset over the short range interface. So long as the handset responds to the polls, no changes are made. However, when the car kit determines that emulation has terminated for one reason or another, e.g., the car phone does not respond, then normal communication is re-enabled.

Another mode contemplated herein is carried out when the hand held cell phone is not brought into the car. When the user forgets the cell phone, for example, the car kit can still function without the handset. Since the car kit includes all necessary cellular equipment, it can transmit and receive using a virtual telephone number. This incurs higher service charges, but may be used on an as-needed basis. Moreover, this enables emergency services such as Telematics or Mayday even without a hand-held phone being present.

In order to save on power, the mode 1 operation may operate in a "park" mode once communication has been started. The park mode saves on power since it prevents communication during most of the time. However, the idle mode enables quick refresh of the operation so that communication can restart in a relatively short time.

After communication is re-established at step 330, the system enters a hands-free operation idle mode. The Bluetooth ACL link is established between the car unit and the handset. The car unit acts as the master of the piconet. If necessary, this may include switching between slave and non-slave, so that power consumption is minimized.

After the driver has entered the car, a Bluetooth ACL link is established between the HF unit and the handset, with the car kit acting as master of the piconet. These will remain active as long as the two units stay within range.

The car kit then starts an SDP session to query the handset for the services offered.

Having verified that the handset supports HF operation, the car kit commands the handset Bluetooth module into Park mode.

In Park mode, the handset Bluetooth module wakes up periodically to listen to a beacon transmission from the car kit. This allows the handset to stay synchronized to the car kit and to detect when the car kit is de-activated or falls out of range. The time between beacon receptions is spent in sleep mode to preserve battery lifetime. If the handset does not receive a beacon transmission for some period of time, e.g., 100 seconds it automatically de-activates HF mode.

Every Nth beacon transmission, the car kit's Bluetooth module sends an unpark command to the handset. When the handset Bluetooth module responds, it is polled by the handset's Bluetooth module. By returning a NULL packet, the handset signals that there is no data to be transferred. The car kit Bluetooth module then commands the handset's Bluetooth module back into Park mode. This handshake procedure is executed to ensure the car kit that the handset is still within range and operating in HF mode.

The driver dials a phone number on the car kit and presses send, or makes some other indication of call initiation.

The HF Bluetooth module uses the next beacon transmission to unpark the handset's Bluetooth module.

When the handset Bluetooth module responds, the car kit, instead of unparking the handset, now starts an exchange of upper-layer protocol messages in which it commands the handset (using the ATD command) to originate a call to the specified phone number.

The handset contacts the cellular network and requests call origination. On the PSTN side, a voice connection is established to the remote switch.

The handset Bluetooth module uses the existing ACL link to establish a two-way SCO voice link to the HF unit.

The cellular network returns an alert message confirming that a voice connection has been established with the remote switch. The handset starts generating a ring back tone in the receive audio path, which is received by the car kit unit over the SCO link.

The subscriber on the remote end goes off hook and the conversation begins. The conversation progresses as follows:

1) The handset receives a page from the cellular network and responds on the access channel. It is then assigned a traffic channel by the base station.

2) The handset waits until the next beacon transmission and then requests to be unparked in the following access window.

3) Upon receiving this request, the car kit Bluetooth module sends an unpark message to the handset over the beacon channel. The ACL link is now re-established.

4) The handset starts an exchange of upper-layer protocol messages over the ACL link, alerting the car kit that there is an incoming call (AT result code RING).

5) The HF unit generates a ring sound to alert the driver.

6) When the driver goes off-hook by pressing a button on the console or steering wheel, the HF unit sends an AT command (AT+CKPD) alerting the handset that the driver whishes to answer the call.

7) The handset Bluetooth module establishes an SCO voice link to the HF Bluetooth module.

8) Conversation begins.

Other embodiments are within the disclosed embodiment. For example, and importantly, the present application is not limited to use with Bluetooth. Other wireless transmission techniques and protocols can be used. In addition, while specific handshaking sequences and techniques have been disclosed, other such techniques are possible.

What is claimed is:

1. A portable phone device comprising:

a first portable phone housing, having a user interface, at least a microphone and speaker, and a cellular transceiver therein, said cellular transceiver operable to transmit signals from said microphone to a cellular network and receive signals from said cellular network and couple them to said speaker, and also having therein a second transceiver, operating to consume a lower power than said cellular transceiver, said second transceiver having a unique device address which uniquely identifies said second transceiver from other transceivers, operating in a multiple access system using time slots over a spread spectrum protocol (X), said second transceiver enabling operation with a remote device which changes a mode of operation of said telephone to a changed mode of operation; wherein said user interface on said portable telephone includes an initiation button which is actuated to initiate a communication using said second transceiver.

2. A portable phone device comprising:

a first portable phone housing, having a user interface, at least a microphone and speaker, and a cellular transceiver therein, said cellular transceiver operable to transmit signals from said microphone to a cellular network and receive signals from said cellular network and couple them to said speaker, and also having therein a second transceiver, operating to consume a lower power than said cellular transceiver, said second transceiver having a unique device address which uniquely identifies said second transceiver from other transceivers, operating in a multiple access system using time slots over a spread spectrum protocol (X), said second transceiver enabling operation with a remote device which changes a mode of operation of said telephone to a changed mode of operation; wherein said remote includes a vehicle-mounted device, said vehicle-mounted device also including another transceiver which having a unique device address which uniquely identifies said another transceiver from other transceivers, operating in a multiple access system using time slots over a spread spectrum protocol and which communicates with said second transceiver in said telephone; and said vehicle mounted station monitors for an event indicating that a user is present.

3. A device as in claim 2, wherein said vehicle mounted station sends inquiries based on detecting said event.

4. A portable phone device comprising:

a first portable phone housing, having a user interface, at least a microphone and speaker, and a cellular transceiver therein, said cellular transceiver operable to transmit signals from said microphone to a cellular network and receive signals from said cellular network and couple them to said speaker, and also having therein a second transceiver, operating to consume a lower power than said cellular transceiver, said second transceiver having a unique device address which uniquely identifies said second transceiver from other transceivers, operating in a multiple access system using time slots over a spread spectrum protocol (X), said second transceiver enabling operation with a remote device which changes a mode of operation of said telephone to a changed mode of operation; wherein said transceiver responds only to requests which include a unique address of said portable telephone.

5. A method of communicating, comprising:

using a portable handset to communicate over a cellular network;

also using said portable handset to communicate with a remote station using a second protocol, such that said remote station and said handset contact one another using said second protocol; and after said remote station and said handset contact one another, at least one operation of said cellular phone being carried out by said portable station; wherein said at least one function is a cellular transmission function:

said portable unit emulates an identity of said cellular phone; and said transmitting comprises establishing in advance, information indicative of said identity, indicating that said phone is present, and, when said phone is indicated as present, using said identity.

6. A method as in claim 5, further comprising storing said identity.

7. A method of communicating, comprising:

using a portable handset to communicate over a cellular network;

also using said portable handset to communicate with a remote station using a second protocol, such that said remote station and said handset contact one another using said second protocol:

after said remote station and said handset contact one another, at least one operation of said cellular phone being carried out by said portable station; and determining an event indicative of a user being in the automobile, and sending a poll only when said event is detected; wherein said connection includes a poll being sent by said remote unit.

8. A method of communicating, comprising:

using a portable handset to communicate over a cellular network;

also using said portable handset to communicate with a remote station using a second protocol, such that said remote station and said handset contact one another using said second protocol;

after said remote station and said handset contact one another, at least one operation of said cellular phone being carried out by said portable station; and storing a list of allowed devices, wherein only devices on said allowed list are accepted when responding to said poll; wherein said connection includes a poll being sent by said remote unit.

9. A method of communicating, comprising:

using a portable handset to communicate over a cellular network;

also using said portable handset to communicate with a remote station using a second protocol, such that said remote station and said handset contact one another using said second protocol; and after said remote station and said handset contact one another, at least one operation of said cellular phone being carried out by said portable station; wherein said communicating comprises paging only a plurality of specific addresses;

said communicating comprises determining a specified event indicative of a user being in the vehicle;

beginning sending said polls responsive to said specified event; and said event is a detection of a user entering an automobile.

* * * * *